(12) United States Patent
Stokes

(10) Patent No.: US 8,929,687 B2
(45) Date of Patent: Jan. 6, 2015

(54) SYSTEM AND METHOD FOR CANDIDATE SORTING AND CLUSTERING

(75) Inventor: Kevin W. Stokes, Shawnee, KS (US)

(73) Assignee: DST Technologies, Inc., Kansas City, MO (US)

( * ) Notice: Subject to any disclaimer, the term of this patent is extended or adjusted under 35 U.S.C. 154(b) by 506 days.

(21) Appl. No.: 13/220,397

(22) Filed: Aug. 29, 2011

(65) Prior Publication Data
US 2013/0054620 A1  Feb. 28, 2013

(51) Int. Cl.
G06K 9/00 (2006.01)
G06F 17/30 (2006.01)
G06K 9/46 (2006.01)

(52) U.S. Cl.
CPC ........ G06F 17/30256 (2013.01); G06K 9/4642 (2013.01); G06K 9/00483 (2013.01); G06F 17/3028 (2013.01)
USPC ....... 382/305; 382/192; 707/749; 707/E17.02

(58) Field of Classification Search
None
See application file for complete search history.

(56) References Cited

U.S. PATENT DOCUMENTS

| | | | | |
|---|---|---|---|---|
| 6,445,818 B1 * | 9/2002 | Kim et al. | ...................... | 382/165 |
| 7,697,754 B2 * | 4/2010 | Park et al. | ...................... | 382/168 |
| 2004/0073543 A1 * | 4/2004 | Kim et al. | .......................... | 707/3 |
| 2007/0288462 A1 * | 12/2007 | Fischer et al. | .................... | 707/7 |
| 2008/0152225 A1 * | 6/2008 | Iwamoto | ....................... | 382/190 |
| 2012/0219211 A1 * | 8/2012 | Ding et al. | ..................... | 382/159 |
| 2013/0343654 A1 * | 12/2013 | Demoulin et al. | ............ | 382/192 |

OTHER PUBLICATIONS

Ester et al. (1996) "A density-based algorithm for discovering clusters." Proc. 2nd Int'l Conf. on Knowledge Discovery and Data Mining, pp. 226-231.*
Wikipedia (2010) "Earth movers distance." Revision as of Jul. 30, 2010.*
Chen et al. (Aug. 2005) "CLUE: Cluster-based retrieval of images by unsupervised learning." IEEE Trans. on Image Processing, vol. 14 No. 8, pp. 1187-1201.*

* cited by examiner

*Primary Examiner* — Barry Drennan
(74) *Attorney, Agent, or Firm* — Lempia Summerfield Katz LLC

(57) ABSTRACT

A system for organizing a plurality of candidates based on the relative similarity of a first candidate with respect to the remaining plurality of candidates is disclosed. The system includes a controller in communication with a storage device configured to receive and accessibly store a generated plurality of candidate images. The controller operable to analyze each of the plurality of candidate images to determined a numeric thumbnail based on a number of identified features in each of a plurality of grid elements of an array and a sum total number of all identified features in the array, calculate a similarity score between one of the plurality of determined numeric thumbnails and each of the remaining plurality of determined numeric thumbnails; and generate a logical group image order as a function of the highest similarity score between the one of the plurality of determined numeric thumbnails and each of the remaining plurality of determined numeric thumbnails.

34 Claims, 20 Drawing Sheets

| 0 | 0 | 0 | 0 | 0 | 0 | 0 | 0 | 0 | 0 | 0 | 0 | 0 | 0 | 0 | 394 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 545 | 115 |
| 0 | 0 | 0 | 0 | 0 | 0 | 0 | 0 | 0 | 0 | 0 | 0 | 0 | 373 | 1113 | 646 |
| 0 | 0 | 0 | 0 | 0 | 0 | 0 | 0 | 0 | 0 | 0 | 0 | 0 | 2038 | 4156 | 485 |
| 0 | 0 | 0 | 0 | 0 | 0 | 0 | 0 | 0 | 0 | 0 | 0 | 0 | 769 | 698 | 680 |
| 0 | 0 | 0 | 0 | 0 | 0 | 0 | 0 | 0 | 0 | 0 | 0 | 201 | 1141 | 4458 | 4143 |
| 0 | 0 | 0 | 0 | 0 | 0 | 0 | 0 | 0 | 0 | 0 | 0 | 673 | 989 | 5663 | 2470 |
| 0 | 0 | 0 | 0 | 0 | 0 | 0 | 0 | 0 | 0 | 814 | 419 | 619 | 0 | 1283 | 3738 |
| 0 | 0 | 0 | 0 | 0 | 0 | 0 | 0 | 0 | 0 | 188 | 1384 | 1710 | 1538 | 663 | 1979 |
| 0 | 0 | 0 | 0 | 0 | 0 | 0 | 0 | 0 | 0 | 0 | 22 | 686 | 1683 | 525 | 244 |
| 0 | 0 | 0 | 0 | 0 | 0 | 0 | 0 | 0 | 0 | 0 | 233 | 611 | 512 | 1325 | 1048 |
| 0 | 0 | 0 | 0 | 0 | 0 | 0 | 0 | 0 | 0 | 17 | 635 | 483 | 0 | 0 | 0 |
| 0 | 0 | 0 | 0 | 0 | 0 | 0 | 341 | 1026 | 1346 | 296 | 0 | 0 | 0 | 0 | 0 |
| 0 | 0 | 0 | 0 | 0 | 222 | 759 | 408 | 672 | 914 | 993 | 29 | 0 | 70 | 0 | 1607 |
| 0 | 0 | 323 | 613 | 715 | 655 | 0 | 0 | 0 | 877 | 803 | 1299 | 937 | 186 | 0 | 227 |
| 257 | 608 | 269 | 0 | 0 | 0 | 0 | 0 | 6 | 959 | 886 | 848 | 0 | 0 | 0 | 0 |

| 433 | 716 | 473 | 368 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 162 | 497 | 0 | 0 | 0 | 0 | 0 | 0 | 0 | 0 | 0 | 0 | 0 |
| 384 | 1121 | 1940 | 487 | 317 | 270 | 0 | 0 | 0 | 0 | 0 | 0 | 0 | 0 | 0 | 0 |
| 0 | 446 | 3888 | 3605 | 599 | 473 | 0 | 0 | 0 | 0 | 0 | 0 | 0 | 0 | 0 | 0 |
| 0 | 675 | 657 | 544 | 157 | 934 | 26 | 0 | 0 | 0 | 0 | 0 | 0 | 0 | 0 | 0 |
| 0 | 4914 | 3330 | 627 | 0 | 479 | 565 | 0 | 0 | 0 | 0 | 0 | 0 | 0 | 0 | 0 |
| 0 | 4188 | 4247 | 904 | 169 | 513 | 311 | 354 | 0 | 157 | 503 | 494 | 309 | 0 | 0 | 0 |
| 5516 | 1490 | 1009 | 0 | 6 | 1143 | 1395 | 125 | 662 | 408 | 0 | 0 | 231 | 629 | 273 | 0 |
| 3869 | 695 | 1038 | 155 | 1525 | 1700 | 265 | 736 | 0 | 0 | 0 | 0 | 0 | 0 | 559 | 186 |
| 1679 | 282 | 1352 | 543 | 713 | 412 | 452 | 175 | 0 | 0 | 0 | 0 | 0 | 0 | 0 | 628 |
| 337 | 250 | 194 | 919 | 664 | 413 | 595 | 0 | 0 | 0 | 0 | 0 | 0 | 0 | 0 | 589 |
| 405 | 1113 | 438 | 0 | 0 | 356 | 1198 | 0 | 0 | 0 | 0 | 0 | 0 | 290 | 350 | 604 |
| 0 | 136 | 2 | 0 | 0 | 0 | 161 | 616 | 0 | 0 | 0 | 0 | 509 | 344 | 711 | 383 |
| 2424 | 149 | 2823 | 4400 | 2747 | 722 | 432 | 358 | 539 | 0 | 0 | 0 | 624 | 0 | 633 | 549 |
| 2502 | 2271 | 2782 | 2691 | 1844 | 3444 | 689 | 0 | 519 | 1689 | 814 | 485 | 595 | 0 | 636 | 0 |
| 0 | 3 | 0 | 129 | 0 | 55 | 309 | 1113 | 1500 | 967 | 0 | 0 | 219 | 286 | 463 | 0 |

| 639 | 0 | 0 | 0 | 0 | 513 | 532 | 475 | 503 | 37 | 591 | 96 | 0 | 0 | 0 | 0 |
|---|---|---|---|---|---|---|---|---|---|---|---|---|---|---|---|
| 832 | 542 | 897 | 712 | 598 | 151 | 0 | 0 | 0 | 0 | 673 | 507 | 543 | 498 | 516 | 507 |
| 0 | 0 | 0 | 0 | 0 | 0 | 0 | 0 | 0 | 449 | 868 | 132 | 0 | 0 | 0 | 0 |
| 0 | 0 | 0 | 0 | 0 | 0 | 0 | 0 | 0 | 529 | 597 | 0 | 0 | 0 | 0 | 0 |
| 0 | 0 | 0 | 0 | 0 | 0 | 0 | 0 | 0 | 0 | 741 | 206 | 0 | 0 | 0 | 0 |
| 0 | 0 | 0 | 0 | 0 | 0 | 0 | 0 | 0 | 0 | 446 | 840 | 540 | 0 | 0 | 0 |
| 0 | 0 | 0 | 0 | 0 | 0 | 0 | 0 | 0 | 0 | 0 | 238 | 761 | 0 | 0 | 0 |
| 0 | 0 | 0 | 0 | 0 | 0 | 0 | 0 | 0 | 0 | 0 | 0 | 721 | 107 | 0 | 0 |
| 0 | 0 | 0 | 0 | 0 | 0 | 0 | 0 | 0 | 0 | 0 | 605 | 548 | 431 | 0 | 0 |
| 0 | 0 | 0 | 0 | 0 | 0 | 0 | 0 | 0 | 0 | 0 | 636 | 0 | 0 | 0 | 0 |
| 0 | 0 | 0 | 0 | 0 | 0 | 0 | 0 | 0 | 0 | 0 | 666 | 0 | 0 | 0 | 0 |
| 0 | 0 | 0 | 0 | 0 | 0 | 0 | 0 | 0 | 0 | 0 | 437 | 276 | 0 | 0 | 0 |
| 0 | 0 | 0 | 0 | 0 | 0 | 0 | 0 | 0 | 0 | 0 | 0 | 692 | 219 | 0 | 0 |
| 0 | 0 | 0 | 0 | 0 | 0 | 0 | 0 | 0 | 0 | 0 | 0 | 0 | 416 | 544 | 530 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

*Fig. 7c*

| 0 | 0 | 0 | 0 | 123 | 0 | 0 | 202 | 1448 | 372 | 0 | 0 | 590 | 462 | 0 | 0 |
|---|---|---|---|---|---|---|---|---|---|---|---|---|---|---|---|
| 531 | 516 | 522 | 537 | 540 | 70 | 0 | 0 | 52 | 975 | 508 | 550 | 56 | 0 | 0 | 0 |
| 0 | 0 | 0 | 0 | 11 | 472 | 552 | 567 | 540 | 625 | 0 | 0 | 0 | 0 | 0 | 0 |
| 0 | 186 | 20 | 0 | 0 | 0 | 0 | 0 | 741 | 1170 | 0 | 0 | 0 | 0 | 0 | 0 |
| 0 | 572 | 73 | 0 | 0 | 0 | 0 | 0 | 824 | 319 | 0 | 0 | 0 | 0 | 0 | 0 |
| 0 | 755 | 0 | 0 | 0 | 0 | 0 | 504 | 475 | 0 | 0 | 0 | 0 | 0 | 0 | 0 |
| 0 | 635 | 0 | 0 | 3 | 577 | 898 | 869 | 0 | 0 | 0 | 0 | 0 | 0 | 0 | 0 |
| 521 | 1038 | 551 | 584 | 608 | 61 | 709 | 0 | 0 | 0 | 0 | 0 | 0 | 0 | 0 | 0 |
| 487 | 743 | 433 | 0 | 0 | 0 | 654 | 0 | 0 | 0 | 0 | 0 | 0 | 0 | 0 | 0 |
| 0 | 0 | 628 | 0 | 0 | 184 | 472 | 0 | 0 | 0 | 0 | 0 | 0 | 0 | 0 | 0 |
| 0 | 0 | 665 | 0 | 0 | 0 | 637 | 0 | 0 | 0 | 0 | 0 | 0 | 0 | 0 | 0 |
| 0 | 683 | 149 | 0 | 0 | 622 | 87 | 0 | 0 | 0 | 0 | 0 | 0 | 0 | 0 | 0 |
| 255 | 1216 | 0 | 0 | 0 | 793 | 724 | 722 | 106 | 0 | 0 | 0 | 0 | 0 | 0 | 0 |
| 408 | 643 | 0 | 0 | 0 | 0 | 2 | 433 | 968 | 0 | 0 | 0 | 0 | 0 | 0 | 0 |
| 0 | 186 | 580 | 654 | 83 | 0 | 0 | 0 | 0 | 688 | 0 | 0 | 0 | 0 | 0 | 0 |
| 0 | 0 | 0 | 0 | 579 | 630 | 546 | 585 | 629 | 372 | 0 | 0 | 0 | 0 | 0 | 0 |

| *Fig. 7a* | *Fig. 7b* |
|---|---|
| *Fig. 7c* | *Fig. 7d* |

Fig. 8b

| 433 | 716 | 473 | 368 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 162 | 497 | 0 | 0 | 0 | 0 | 0 | 0 | 0 | 0 | 0 | 0 | 0 |
| 384 | 1121 | 1940 | 487 | 317 | 270 | 0 | 0 | 0 | 0 | 0 | 0 | 0 | 0 | 0 | 0 |
| 0 | 446 | 3888 | 3605 | 599 | 473 | 0 | 0 | 0 | 0 | 0 | 0 | 0 | 0 | 0 | 0 |
| 0 | 675 | 657 | 544 | 157 | 934 | 26 | 0 | 0 | 0 | 0 | 0 | 0 | 0 | 0 | 0 |
| 0 | 4914 | 3330 | 627 | 0 | 479 | 565 | 0 | 0 | 0 | 0 | 0 | 0 | 0 | 0 | 0 |
| 0 | 4188 | 4247 | 904 | 169 | 513 | 311 | 354 | 0 | 157 | 503 | 494 | 309 | 0 | 0 | 0 |
| 5516 | 1490 | 1009 | 0 | 6 | 1143 | 1395 | 125 | 662 | 408 | 0 | 0 | 231 | 629 | 273 | 0 |
| 3869 | 695 | 1038 | 1155 | 1525 | 1700 | 265 | 736 | 0 | 0 | 0 | 0 | 0 | 0 | 559 | 186 |
| 1679 | 282 | 1352 | 543 | 713 | 412 | 452 | 175 | 0 | 0 | 0 | 0 | 0 | 0 | 0 | 628 |
| 337 | 250 | 194 | 919 | 664 | 413 | 595 | 0 | 0 | 0 | 0 | 0 | 0 | 0 | 0 | 589 |
| 405 | 1113 | 438 | 0 | 0 | 356 | 1198 | 0 | 0 | 0 | 0 | 0 | 0 | 290 | 350 | 604 |
| 0 | 136 | 2 | 0 | 0 | 0 | 161 | 616 | 0 | 0 | 0 | 0 | 509 | 344 | 711 | 883 |
| 2474 | 3149 | 2823 | 4400 | 2747 | 1722 | 432 | 358 | 539 | 0 | 0 | 0 | 624 | 0 | 633 | 549 |
| 2502 | 2271 | 2782 | 2691 | 1844 | 3444 | 689 | 0 | 519 | 1689 | 814 | 485 | 595 | 0 | 636 | 0 |
| 0 | 3 | 0 | 129 | 0 | 55 | 309 | 1113 | 1500 | 967 | 0 | 0 | 219 | 286 | 463 | 0 |

| 639 | 0 | 0 | 0 | 0 | 513 | 532 | 475 | 503 | 37 | 591 | 96 | 0 | 0 | 0 | 0 |
|---|---|---|---|---|---|---|---|---|---|---|---|---|---|---|---|
| 832 | 542 | 897 | 712 | 598 | 151 | 0 | 0 | 0 | 0 | 673 | 507 | 543 | 498 | 516 | 507 |
| 0 | 0 | 0 | 0 | 0 | 0 | 0 | 0 | 0 | 449 | 888 | 132 | 0 | 0 | 0 | 0 |
| 0 | 0 | 0 | 0 | 0 | 0 | 0 | 0 | 0 | 529 | 597 | 0 | 0 | 0 | 0 | 0 |
| 0 | 0 | 0 | 0 | 0 | 0 | 0 | 0 | 0 | 0 | 741 | 206 | 0 | 0 | 0 | 0 |
| 0 | 0 | 0 | 0 | 0 | 0 | 0 | 0 | 0 | 0 | 446 | 840 | 540 | 0 | 0 | 0 |
| 0 | 0 | 0 | 0 | 0 | 0 | 0 | 0 | 0 | 0 | 0 | 238 | 761 | 0 | 0 | 0 |
| 0 | 0 | 0 | 0 | 0 | 0 | 0 | 0 | 0 | 0 | 0 | 0 | 721 | 107 | 0 | 0 |
| 0 | 0 | 0 | 0 | 0 | 0 | 0 | 0 | 0 | 0 | 0 | 605 | 548 | 431 | 0 | 0 |
| 0 | 0 | 0 | 0 | 0 | 0 | 0 | 0 | 0 | 0 | 0 | 636 | 0 | 0 | 0 | 0 |
| 0 | 0 | 0 | 0 | 0 | 0 | 0 | 0 | 0 | 0 | 0 | 666 | 0 | 0 | 0 | 0 |
| 0 | 0 | 0 | 0 | 0 | 0 | 0 | 0 | 0 | 0 | 0 | 437 | 276 | 0 | 0 | 0 |
| 0 | 0 | 0 | 0 | 0 | 0 | 0 | 0 | 0 | 0 | 0 | 0 | 692 | 219 | 0 | 0 |
| 0 | 0 | 0 | 0 | 0 | 0 | 0 | 0 | 0 | 0 | 0 | 0 | 0 | 416 | 544 | 530 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

*Fig. 8c*

| 0 | 0 | 0 | 0 | 123 | 0 | 0 | 202 | 1448 | 372 | 0 | 0 | 590 | 462 | 0 | 0 |
|---|---|---|---|---|---|---|---|---|---|---|---|---|---|---|---|
| 531 | 516 | 522 | 537 | 540 | 70 | 0 | 0 | 52 | 975 | 508 | 550 | 56 | 0 | 0 | 0 |
| 0 | 0 | 0 | 0 | 11 | 472 | 552 | 567 | 540 | 625 | 0 | 0 | 0 | 0 | 0 | 0 |
| 0 | 186 | 20 | 0 | 0 | 0 | 0 | 0 | 741 | 1170 | 0 | 0 | 0 | 0 | 0 | 0 |
| 0 | 572 | 73 | 0 | 0 | 0 | 0 | 0 | 824 | 319 | 0 | 0 | 0 | 0 | 0 | 0 |
| 0 | 755 | 0 | 0 | 0 | 0 | 0 | 504 | 475 | 0 | 0 | 0 | 0 | 0 | 0 | 0 |
| 0 | 635 | 0 | 0 | 3 | 577 | 898 | 869 | 0 | 0 | 0 | 0 | 0 | 0 | 0 | 0 |
| 521 | 1038 | 551 | 584 | 608 | 61 | 709 | 0 | 0 | 0 | 0 | 0 | 0 | 0 | 0 | 0 |
| 487 | 743 | 433 | 0 | 0 | 0 | 654 | 0 | 0 | 0 | 0 | 0 | 0 | 0 | 0 | 0 |
| 0 | 0 | 628 | 0 | 0 | 184 | 472 | 0 | 0 | 0 | 0 | 0 | 0 | 0 | 0 | 0 |
| 0 | 0 | 665 | 0 | 0 | 0 | 637 | 0 | 0 | 0 | 0 | 0 | 0 | 0 | 0 | 0 |
| 0 | 683 | 149 | 0 | 0 | 622 | 87 | 0 | 0 | 0 | 0 | 0 | 0 | 0 | 0 | 0 |
| 255 | 1216 | 0 | 0 | 0 | 793 | 724 | 722 | 106 | 0 | 0 | 0 | 0 | 0 | 0 | 0 |
| 408 | 643 | 0 | 0 | 0 | 0 | 0 | 2 | 433 | 968 | 0 | 0 | 0 | 0 | 0 | 0 |
| 0 | 186 | 580 | 654 | 83 | 0 | 0 | 0 | 0 | 688 | 0 | 0 | 0 | 0 | 0 | 0 |
| 0 | 0 | 0 | 0 | 579 | 630 | 546 | 585 | 629 | 372 | 0 | 0 | 0 | 0 | 0 | 0 |

| *Fig. 8a* | *Fig. 8b* |
|---|---|
| *Fig. 8c* | *Fig. 8d* |

(1,1) - 0    (1,8) - 1054    (1,16) - 0

| | | | | | | | | | | | | | | | |
|---|---|---|---|---|---|---|---|---|---|---|---|---|---|---|---|
| | | | | | | |1054|1149|1003|497| | | | | |
| | | | | | |2411|6400|1951|9920|1659| | | | | |
| | | | | | |2111|9929|5589|5158|1570|591| | | | |
| | | | | |1233|2281|13154|11194|6160|1831|2185|1227|997|1169|273|
| | | | | |1594|5612|3411|6525|4088|4350|4350| | | |1373|
| | | | |17|1351|1123|2373|2105|1551|1433|1793| | |290|1543|
| | | |222|1508|3958|1318|70|1607|5759|7225|4469|1567|539| |1477|2776|
| |865|1205|1280| |1842|3836|1123|227|4776|5602|5343|2111|4671|1299|1100|1090|
|2063|1609|1262|1007|540|1867|1041|1023|1047|1059|733|202|2847|1058|1078| |
| | | | |978|1617| | |186|20|483|1119|3076| | | |
| | | | |2233|530| |1327|73| |504|1618| | | | |
| | | | |238|1589| |2194|1135|1249|2476| | | | | |
| | | | |1241|979| |1230|1061|184|1126| | | | | |
| | | | |1103|276| |683|814|622|724| | | | | |
| | | | | |1327|1074|2522| |793|1048|1507| | | | |
| | | | | | |186|1234|1292|1131|1689| | | | | |

(1,1) - 0     (1,8) - 0     (1,16) - 0

| | | | | | | | | | | | | | | | |
|---|---|---|---|---|---|---|---|---|---|---|---|---|---|---|---|
| | 9 | 3074 | 2107 | | | | 4241 | 2870 | 4248 | 2604 | 3203 | | | | |
| | 3768 | 2607 | 2573 | 3237 | 2511 | 1734 | 5189 | 6727 | 2542 | 2389 | 3175 | 2560 | | | |
| | 25 | 3557 | 4999 | 4977 | 4575 | 5087 | 4758 | 1432 | 3230 | 5273 | | 4208 | 4 | | |
| | | | 2114 | 4859 | 5239 | 5725 | 2363 | 8616 | 978 | 3265 | 6246 | 1521 | | | |
| | | | 1764 | 3768 | 5182 | 2872 | 3581 | 3695 | 4240 | 1777 | 1991 | 2699 | | | |
| | | | 266 | 6697 | 4362 | 2848 | 1261 | 1918 | 1 | | 4791 | 4184 | 4096 | 1301 | |
| | 62 | 5389 | 3280 | 3747 | 107 | | 836 | 3077 | 6944 | 4389 | 7754 | 2192 | 929 | 5750 | 7090 |
| 1405 | 4467 | 1235 | 2510 | | 145 | 1239 | 30 | 3504 | 89 | | 31 | 3802 | 3752 | 1606 | 1897 |
| 5564 | | | 2370 | 1525 | 203 | 3045 | 6569 | 8856 | 7797 | 7766 | 7118 | 295 | | | |
| 4713 | | | 1627 | 2977 | 468 | 2399 | 1622 | 3310 | 2722 | 4611 | | | | | |
| 5449 | | | | 194 | 2377 | 2685 | 2664 | 4751 | 5497 | 547 | | | | | |
| 1412 | 4881 | 1573 | | 3748 | 1248 | 3216 | 3768 | 1948 | 5537 | | | | | | |
| | | 4517 | 3142 | 49 | 2395 | 6140 | 7723 | 601 | 2889 | 5314 | | | | | |
| | 5672 | 5010 | 2531 | 4122 | 5445 | 1665 | 5305 | 2762 | 3550 | 5333 | 3390 | 2144 | | | |
| 4691 | 9124 | 4059 | 2608 | 4073 | 4173 | 10679 | 20404 | 16873 | 10251 | 8772 | 6540 | 4047 | | | |
| | | 1903 | 5201 | 5107 | 4943 | 3957 | | | | | | | | | |

SYSTEM AND METHOD FOR CANDIDATE SORTING AND CLUSTERING

TECHNICAL FIELD

This patent document discloses and generally relates to a system and method for document and candidate sorting and clustering, and more particularly to a system and method configured to sort and otherwise group candidates in a logical group image order that organizes observations and information into an unknown number of clusters based on their relative similarity.

BACKGROUND

Document receiving organizations often receive vast quantities of printed forms, such as insurance forms, financial forms, magazine subscription forms, and change of address forms, containing user provided or submitted information. These documents and forms are typically received in high volume, arranged in a random and unsorted manner and in a wide variety of conditions. Each of these received physical documents and forms are, upon receipt, scanned to generate an electronic document image for further processing and organization. The scanning process often captures image artifacts representing coffee stains, ink smudges, and/or typed and handwritten information provided by a user. Moreover, the scanning process, such as facsimile transmission, often distorts the electronic document image by introducing distortion in the form of image skew, rotation and translation. The variations make known comparison techniques derived from pixel and location checking difficult and further complicates the task of processing and organizing the electronic document and form images.

Moreover, because these documents and forms are received in a random order and include an unknown number of document form types, known clustering routines are inapplicable.

BRIEF DESCRIPTION OF THE FIGURES

FIGS. 6 and 7a to 7d illustrate an exemplary candidate image and an overlaid grid array;

FIGS. 8a to 8d and 9a to 9d illustrate a processed grid array and a processed representation of the exemplary candidate image shown in FIGS. 6 and 7a to 7d.

DETAILED DESCRIPTION

Figure 1:
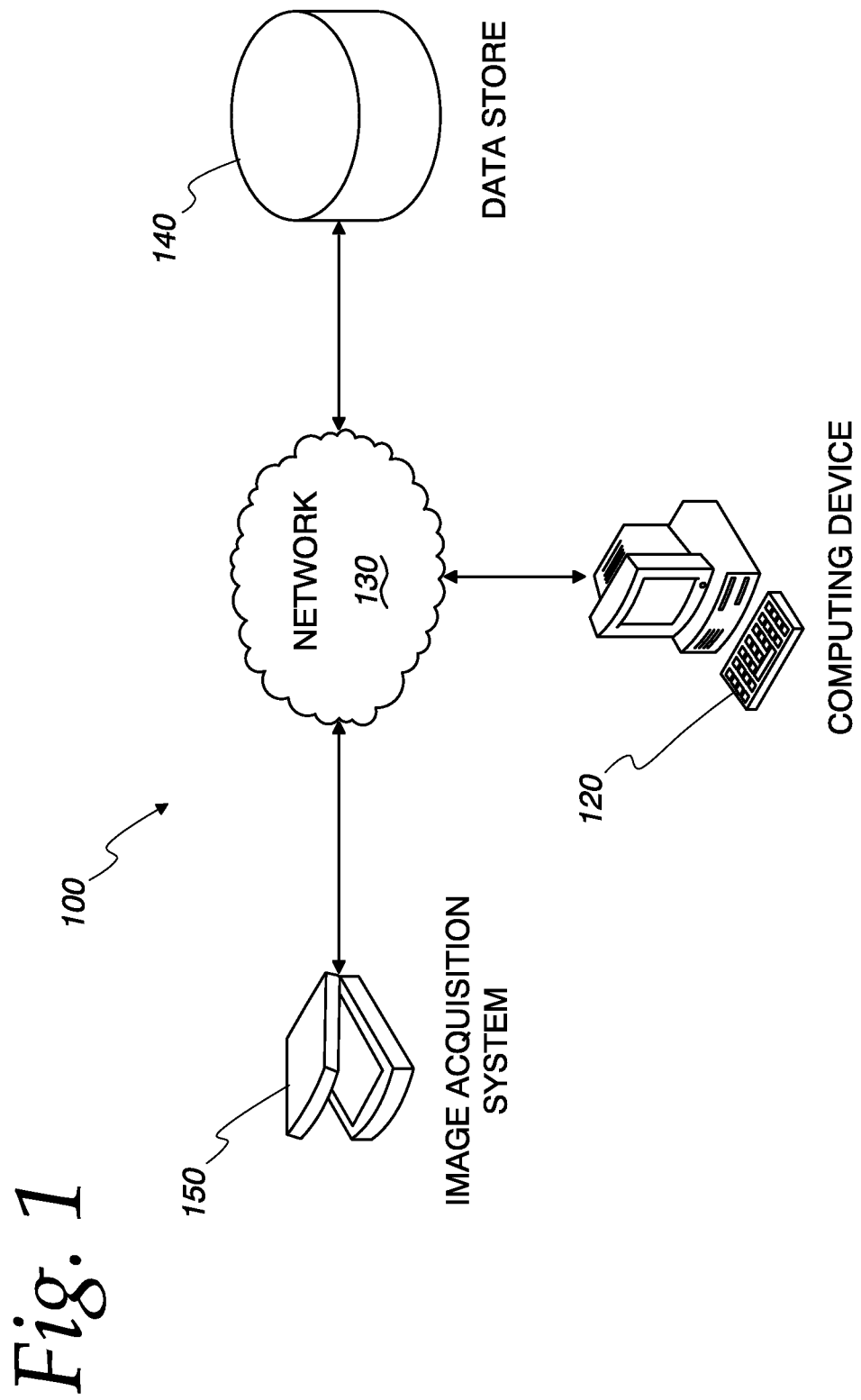
FIG. 1 is a general overview of a system configured to implement a candidate sorting and clustering algorithm and process according to the teaching and disclosure provided herein.

The system, methods disclosed and discussed in this patent document relate to a mechanism and algorithm for sorting and clustering a group of document or candidate images containing an unknown number of candidate types into an unknown number of different groups of clusters. In this way, the disclosed system and method reduces and eliminates the manual processing and organizing steps utilized by today's systems by automatically identifying, grouping and clustering like forms together without requiring knowledge or definition of the final number of clusters prior to execution. For instance, known k-means clustering techniques require that the number of clusters or groups be defined before the clustering analysis implements. Because the composition and organization of the documents and forms received by the document receiving organization are unknown, k-means clustering techniques yield poor results and are considered unreliable. The uncertainty of known analysis and clustering techniques requires user intervention to resolve discrepancies that, in turn, slow down the recognition and intake process. Moreover, the more time that a user must devote to resolving processing issues; the less time available for other productive tasks. The disclosed system and methods address and overcome the limitations of known sorting and clustering algorithms by providing a robust mechanism by which a collection of documents or candidates containing an unknown number of document or candidate types can be clustered and arranged into groups without requiring a definition of the final number of clusters or groups before implementation of the clustering process.

In one embodiment of the disclosed system and methods, a scanned image representative of a received form or candidate document is evaluated against a remaining plurality of scanned images representing an unknown number and type distribution of received candidate documents. In this exemplary embodiment, the scanned image is subdivided into a grid comprising an array of numerous grid elements. Individual grid elements are then analyzed to identify features such as the number of non-white pixels contained therein. A numeric thumbnail is, in turn, defined based on the number of identified features in each grid element of the array and a sum total number of all identified features in the array itself. Once numeric thumbnails have been defined for each of the scanned images representative of the received plurality of candidate documents, these numeric thumbnails can be compared to derive a similarity score. The similarity score is calculated between a first numeric thumbnail and every other numeric thumbnail associated with a sample set containing the received candidate documents. The numeric thumbnail determined to have the highest similarity score relative to the first numeric thumbnail is stored or listed next to the first thumbnail and becomes the starting point for the next iteration of the similarity score calculation. In this manner, the numeric thumbnails and ultimately the candidate documents that they represent are sorted and arranged in logical group image order. Once the numeric thumbnails and the candidate documents that they represent are arranged in logical group image order, they can be further sorted or grouped to define one or more clusters of similar candidate documents. These clustered documents can then be presented to the document receiving organization and/or the user for more efficient processing and handling.

I. System Overview

FIG. 1 provides a general overview of a system 100 for candidate clustering and sorting that may be implemented by a document receiving organization. The displayed representation is intended to illustrate one possible configuration of the system 100, other configuration can include fewer components and in other configurations additional components may be utilized. Variations in the arrangement and type of these components may be made without departing from the spirit or scope of the claims as set forth herein. These changes in configurations and components can increase or alter the capabilities of the system 100.

The exemplary system 100 includes a computing device 120, a network 130, a data store 140, and an image acquisition device 150. The computing device 120, in this embodiment, displays and provides an operator interface for use by an operator. The image acquisition device 150 may simply receive candidate or candidate images from other sources or terminals connected through the network 130. Alternatively, or in addition to, the image acquisition device 150 may be used to create one or more electronic or candidate images captured from one or more paper documents containing typographic, graphical or other information corresponding to, for example, a form and handwritten information provided by a form filer.

The graphical and typographic information contained or represented by each candidate image or electronic document image corresponds to typographic information of forms of varying document or candidate types that are received by the system 100. The graphical and typographic information may be information printed, or applied, to the medium by a machine, such as an inkjet or laser printer. The graphical and typographic information may be identified by any number of characteristics, such as typeface, color, point size, line length, leading space, tracking space, kerning space, pixel count, pixel density, brightness. The graphical and typographic information may indicate where handwritten information should be applied to the medium using lines, boxes or other indicators that provide visual cues to where handwritten information should be provided. The handwritten information may be applied to the medium using a writing implement, such as a pen, pencil, stylus, marker, crayon or other writing instruments. The writing implement, in another embodiment, may be a handheld device for applying information on a medium that can create a smooth, controllable line. Information may further be provided or recorded on the medium via, for example, a typewriter, a label maker, laser or inkjet printers or other electronic and/or mechanical means.

A. Image Acquisition Device

The image acquisition device 150 may be a device capable of converting information contained on the medium into an electronic document image or otherwise receiving electronic document images from another source, such as from a storage device or via a wired or wireless network. For example, the image acquisition device 150 may be a scanner or other digital image capture device. The image acquisition device 150 communicates with the computing device 120 and the data store 140 through the network 130. Alternatively, or in addition to, the image acquisition device 150 may be in direct communication with one or more of the computing device 120 or the data store 140 utilizing a wired connection such as a universal serial bus (USB) connection, a serial connection or other known or later developed connection scheme or protocol. In yet another embodiment, the image acquisition device 150 may be combined with or include elements of the computing device 120 or the data store 140. For example, the image acquisition device 150 may be a handheld device with a camera that can capture an image of a document, such a smartphone or tablet including a camera or generally any handheld device capable of generating an electronic document image from a physical document. The image acquisition device 150 may be one source of some or all of the noise and artifacts introduced into the candidate image. For example, as the image acquisition device 150 scans and captures the candidate image, slight amounts of image skew and/or changes in the image scale may be introduced.

In an embodiment, an operator or user monitors the progress of the system 100 via an operator interface (not shown) configured to facilitate the review of the electronic document images generated by the image acquisition device 150. If the system 100 is unable to identify a document or candidate type corresponding to a received electronic document image, the operator may interact with the operator interface to manually identify the document or candidate type corresponding to the received electronic document image.

B. Data Store

The data store 140 may be operative to store information, patterns and details relating to the candidate, candidate image and/or electronic document. The stored information may include transformations of the electronic document images, the typographic information, or any other data related to the system 100. The other data related to the system 100 may include information describing known sample sets and exemplars, such as electronic document images depicting blank forms used by the organization. For example, the data store 140 may store a set of models and patterns describing each image or document within the sample set. Models may include a numeric thumbnail and/or a fingerprint that uniquely identifies each image in the sample set.

The data store 140 represents one or more relational databases or other data stores managed using various known database management techniques, such as, for example, SQL and object-based techniques. The data store 140 implements using one or more magnetic, optical, solid state or tape drives, or other storage mediums available now or later developed.

In this embodiment the data store 140 is shown in communication with the computing device 120 via the network 130. In this configuration, the data store 140 implements as a database server running MICROSOFT SQL SERVER®, ORACLE®, IBM DB2® or any other database software. The data store 140 may further be in communication with other computing devices and servers through the network 130.

C. Network

The network 130 may include wide area networks (WAN), such as the Internet, local area networks (LAN), campus area networks, metropolitan area networks, or any other networks that may facilitate data communication. The network 130 may be divided into sub-networks that allow access to all of the other components connected to the network 130 in the system 100. Alternatively, the sub-networks may restrict access between the components connected to the network 130. The network 130 may be configured as a public or private network connection and may include, for example, a virtual private network or an encryption scheme that may be employed over the public Internet.

D. Computing Device

The computing device 120 may be connected to the network 130 in any configuration that supports data transfer. These configurations include both wired and wireless data connections to the network 130. The computing device 120 can further run a web application on any platform that supports web content, such as a web browser or a computer, a mobile phone, personal digital assistant (PDA), and/or any appliance or device capable of data communications.

The computing device 120 will typically include a processor, memory, a display, a user interface and a communication interface. The processor may be operatively coupled with the memory, display and the interfaces and to perform tasks at the request of the standalone application or the underlying operating system. Herein, the phrases "coupled with", "in communication with" and "connected to" are defined to mean components arranged to directly or indirectly exchange information, data and commands through one or more intermediate components. The intermediate components may include both hardware and software based components.

The memory represents any hardware configuration capable of storing data. The display operatively couples to the memory and the processor in order to display information to the operator. The user interface, in turn, is stored in the memory and executed by the processor for display via the display. The user interface provides a mechanism by which an operator can interact with the system and matching program and algorithm. From the above descriptions, it is to be inferred that the system and method for sorting and clustering candidate images is highly adaptable and configurable. The flexible nature of the disclosed system and method allow for a wide variety of implementations and uses for the discussed and disclosed technology and algorithms.

Herein, the phrase "operatively coupled" is defined to mean two or more devices configured to share resources or information either directly or indirectly through one or more intermediate components. The communication interface may be operatively coupled with the memory, and the processor, and may be capable of communicating through the network 130 with the image acquisition device 150. The standalone application may be programmed in any programming language that supports communication protocols. Examples of these languages include: SUN JAVA®, C++, C#, ASP, SUN JAVASCRIPT®, asynchronous SUN JAVASCRIPT®, or ADOBE FLASH ACTIONSCRIPT®, amongst others.

The computing device 120 may be any mobile device that has a data connection and may run a mobile application. The data connection may be a cellular connection, a wireless data connection, an Internet connection, an infrared connection, a Bluetooth connection, or any other connection capable of transmitting data. For example, the mobile application may be an application running on an iPhone™ available from Apple, Inc.

E. Computing System Layout

Figure 2:
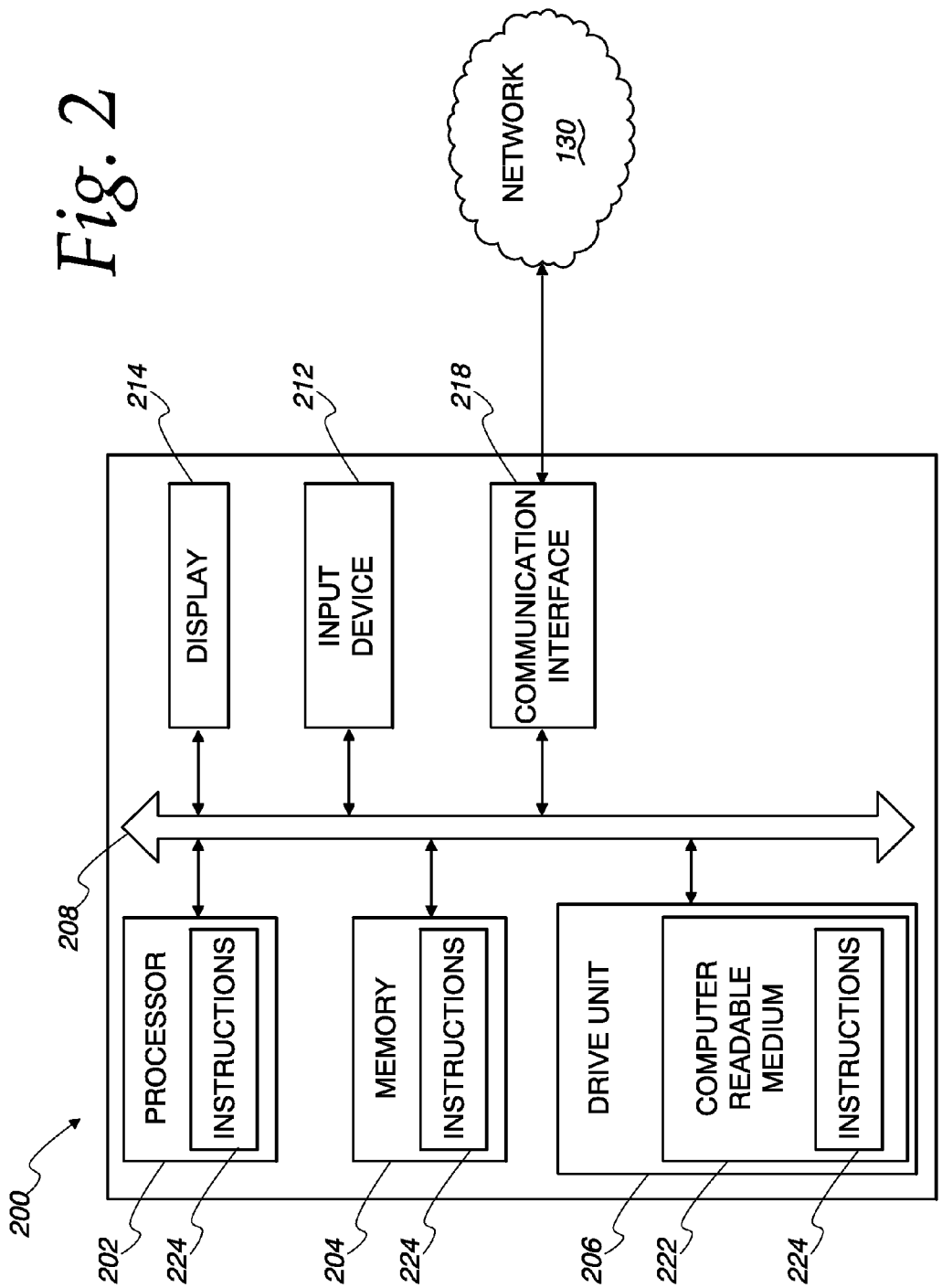
FIG. 2 illustrates a general computer system that may be used in the system of FIG. 1, or other systems for candidate sorting and clustering.

FIG. 2 illustrates a layout and configuration for a generalized computer system 200 such as the computing device 120, or any of the other computing devices referenced herein. The computer system 200 stores and executes algorithms and processor-executable instructions 224 to cause the performance of any one or more of the methods or computer based functions discussed and disclosed in this patent document. The computer system 200 may operate as a standalone device or may be connected to other computer systems or peripheral devices.

In a networked deployment, the computer system 200 may operate in the capacity of either a server or a client computer in a server-client network environment, or as a peer computer system in a peer-to-peer (or distributed) network environment. The computer system 200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing the processor-executable instructions 224 (sequential or otherwise) that specify actions to be taken by that machine. In a particular embodiment, the computer system 200 may be implemented using electronic devices that provide voice, video or data communication. Further, while a single computer system 200 may be illustrated, the term "system" shall also be taken to include any collection of systems or sub-systems that individually or jointly execute a set, or multiple sets, of processor-executable instructions to perform one or more functions via the network 130.

As illustrated in FIG. 2, the computer system 200 includes a processor 202, such as, a central processing unit (CPU), a graphics-processing unit (GPU), or both. The processor 202 may be a component in a variety of systems. For example, the processor 202 may be part of a standard personal computer or a workstation. The processor hardware may incorporate one or more general processors, digital signal processors, application specific integrated circuits, field programmable gate arrays, servers, networks, digital circuits, analog circuits, combinations thereof, or other now known or later developed devices for analyzing and processing data.

The computer system 200 may include a memory 204 that can communicate via a bus 208. The memory 204 can be divided or segmented into, for example, a main memory, a static memory, and a dynamic memory. The memory 204 includes, but may not be limited to, computer readable storage media and various types of volatile and non-volatile storage media such as: random access memory; read-only memory; programmable read-only memory; electrically programmable read-only memory; electrically erasable read-only memory; flash memory; magnetic tape or disk; optical media and the like. In one case, the memory 204 includes a cache or random access memory for the processor 202. Alternatively, or in addition to, the memory 204 may be system memory that is separated and/or distinct from the processor 202.

The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is configured to store processor-executable instructions 224 utilizable by the processor 202. The functions, acts or tasks illustrated in the figures or described herein may be performed by the programmed processor 202 executing the instructions 224 stored in the memory 204. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 200 may further include a display 214, such as a liquid crystal display (LCD), an organic light emitting diode (OLED), a flat panel display, a solid state display, a cathode ray tube (CRT), a projector, a printer or other now known or later developed display device for outputting determined information. The display 214 acts as an interface for the user to see the functioning of the processor 202 and interact with the software (including the processor-executable instructions 224) stored in the memory 204 or in the drive unit 206.

The computer system 200 further includes an input device 212 configured to allow a user to interact with any of the components of system 200. The input device 212 may be a number pad, a keyboard, or a cursor control device, such as a mouse, or a joystick, touch screen display, remote control or any other device operative to interact with the system 200.

The computer system 200, in other embodiments, includes a disk or optical drive unit 206 to accessibly interpret computer-readable medium 222 on which software embodying algorithms or processor-executable instructions 224 is embedded. The algorithms or processor-executable instructions 224 perform one or more of the methods or logic as described herein. The algorithms 224 may reside completely, or at least partially, within the memory 204 and/or within the processor 202 during execution by the computer system 200. The memory 204 and the processor 202 also may include other forms or configurations of computer-readable media as discussed above.

The present disclosure contemplates a computer-readable medium 222 that includes processor-executable instructions 224 or receives and executes instructions 224 responsive to a propagated signal; so that a device connected to a network 130 may communicate voice, video, audio, images or any other data over the network 130. Further, the processor-executable instructions 224 may be transmitted or received over the network 130 via a communication interface 218. The communication interface 218 may be implemented in software or may be a physical connection in hardware. The communication interface 218 provides a connection with the network 130, external media, the display 214, or any other components in system 200 or combinations thereof. In one embodiment, the connection with the network 130 is a physical connection such as a wired Ethernet connection or may be established wirelessly such as via a cellular telephone network (GSM, CDMA, etc.), an IEEE 802.11 (WiFi) network, an 802.16 (WiMax) network, an 802.20 (wireless broadband) network, and a Bluetooth or personal area network (PAN). The network 130 in other embodiments can be a public network, such as the Internet, a private network, such as an intranet, or combinations thereof, and may utilize a variety of networking protocols now available or later developed including, but not limited to TCP/IP based networking protocols.

The computer-readable medium 222 may be a single medium or may comprise multiple mediums such as a centralized or distributed database and/or associated caches and servers that store one or more sets of instructions. The term "computer-readable medium" is generally utilized to describe any medium that may be capable of storing, encoding or carrying an algorithm or set of instructions for execution by a processor or that may cause a computer system to perform any one or more of the methods or operations disclosed herein.

The computer-readable medium 222 may include a solid-state memory such as a memory card or other package that houses one or more non-volatile read-only memories. The computer-readable medium 222 further includes or encompasses random access memory or other volatile re-writable memory. Additionally, the computer-readable medium 222 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The present disclosure may be considered to include any one or more of a computer-readable medium or a distribution medium and other equivalents and successor media, in which data or instructions may be stored.

In other embodiments, dedicated hardware implementations, such as application specific integrated circuits (ASIC), programmable logic arrays and other hardware devices, may be constructed to implement one or more of the methods described herein. Applications that include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

II. Sorting and Clustering Example

Figure 3:
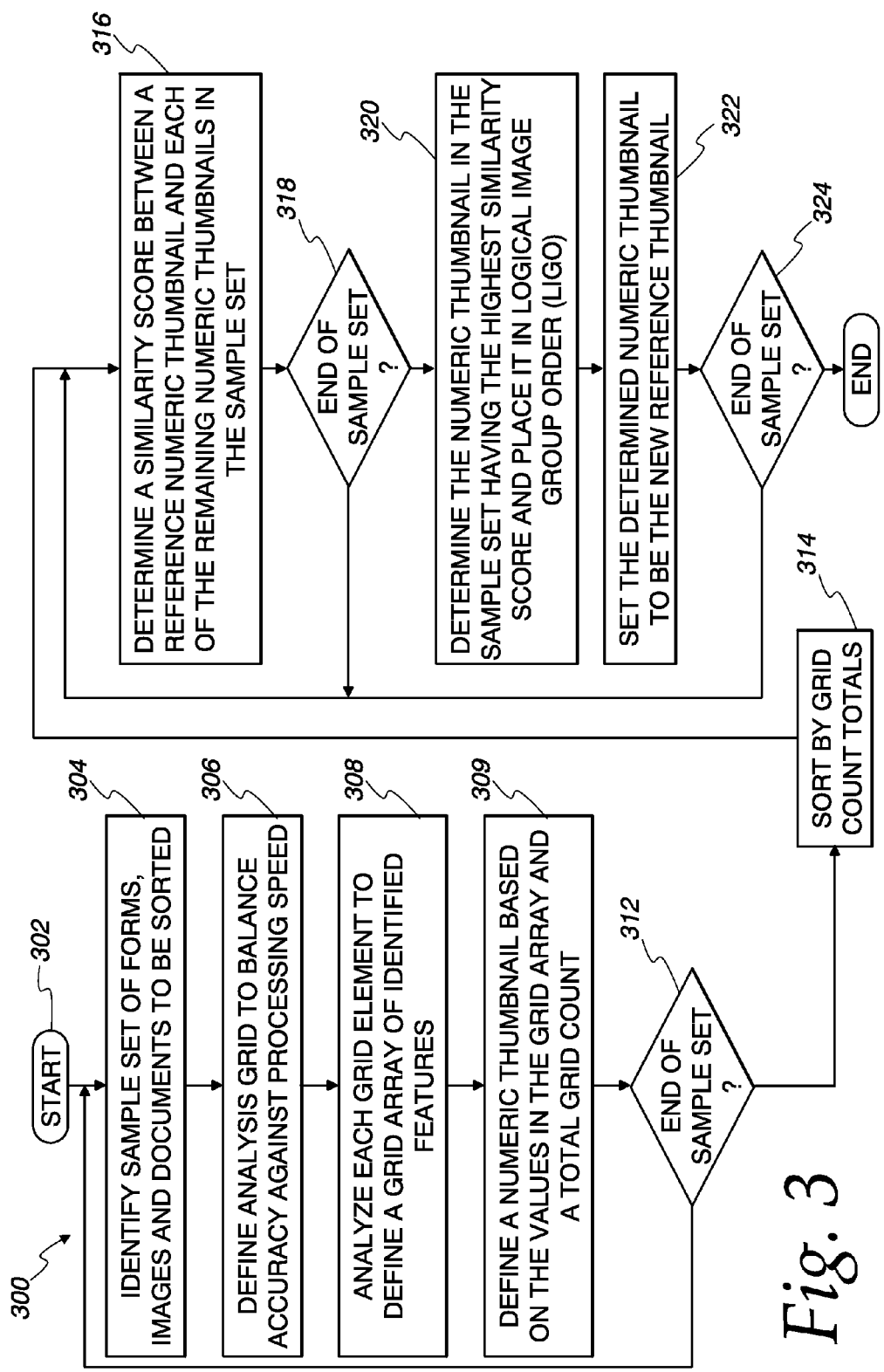
FIG. 3 is a flowchart illustrating the steps, functions and procedures implemented in connection with an exemplary candidate sorting and clustering algorithm.
Figure 4:
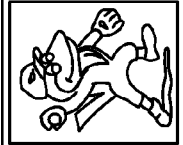
FIGS. 4 and 5 illustrate exemplary sample sets which may be sorted and clustered utilizing the disclosed algorithms and systems.
Figure 5:
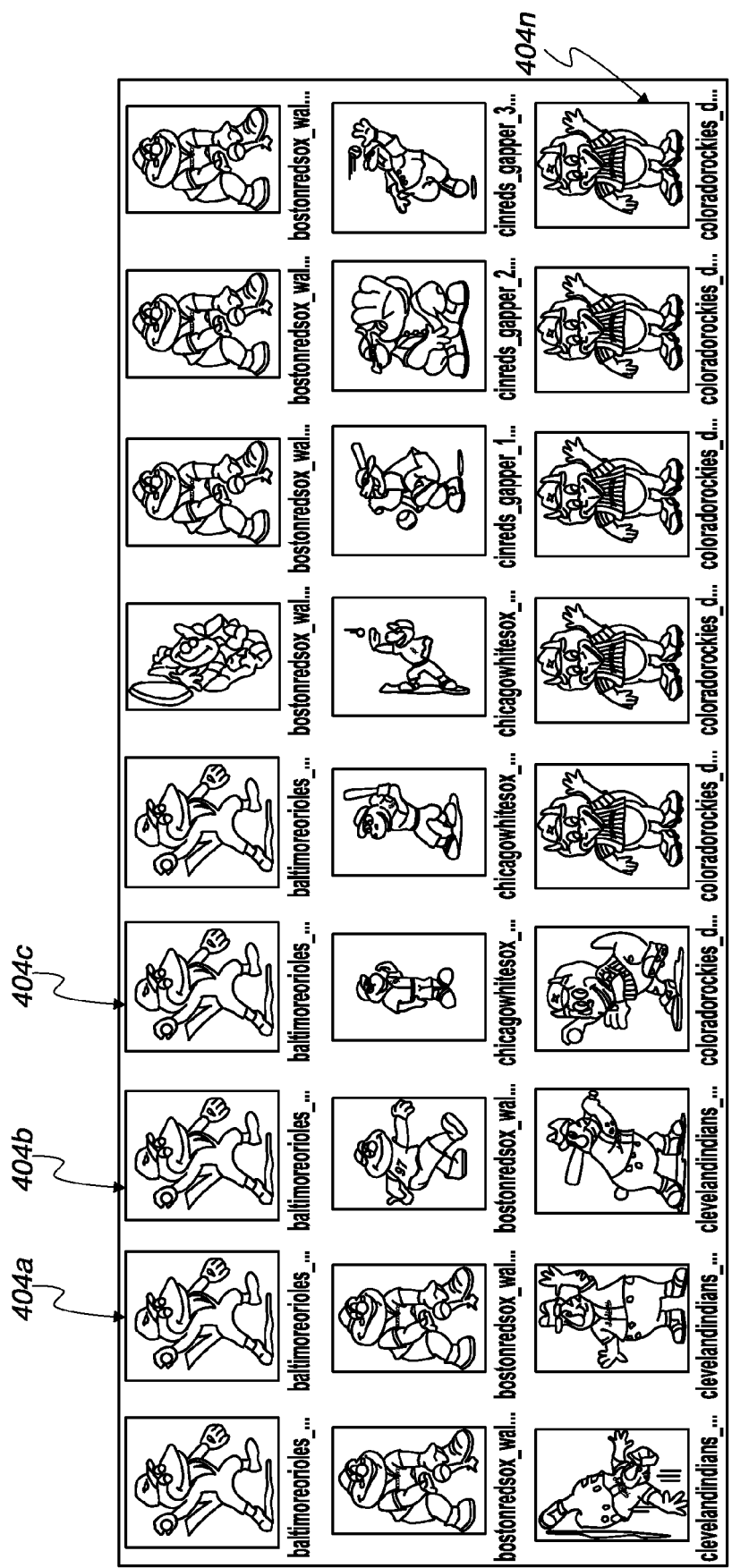

FIG. 3 is a flowchart illustrating the processes implemented in connection with an exemplary candidate sorting and clustering algorithm 300. The algorithm 300 may be stored as part of the processor-executable instructions 224 or may be programmed and embodied on application-specific integrated circuit (ASIC) customized for the task. The algorithm 300 may be employed to sort, identify and cluster forms, documents and candidate images including an unknown number of document or candidate types into an unknown number of groups of clusters. For the sake of example, the candidate images analyzed by the disclosed algorithm 300 are selected from the trademarked images of mascots from Major League Baseball (MLB) teams, copies of which can be viewed and obtained at the MLB website (http://mlb.mlb.com/mlb/kids/mascots.jsp). Each of the mascot images is a registered trademark with both the individual teams and MLB. The algorithm 300 is discussed in connection with the images shown in FIGS. 4 to 7, 10 and 11. These figures depict prior images of Lou Seal™/© San Francisco Giants and Homer the Brave™/© Atlanta Braves. While these images are used to discuss and illustrate the patentable concepts and processed embodied in the algorithm 300, it will be understood that other images and candidates may be utilized and/or analyzed based on the teaching and disclosure provided herein.

The algorithm 300 initiates with a sample set 400 containing numerous images 402a to 402n to be analyzed, sorted and ultimately clustered (302). In order to better simulate a form, FIG. 5 includes variations 404a to 404n of the images 402a to 402n (hereinafter referred to collectively as sample images 402). The variations 404a to 404n can include the addition of greyscale shading and/or colors (see variation 404n), dithering or changes in pixilation density (see variation 404a to 404c). By changing and/or altering the fill and image density, these graphic images can be modified to simulate the pixel density of typical text-based documents. The images 402a to 402n and the variations 404a to 404n define the sample set 400 to be analyzed (304).

As the algorithm 300 continues to execute, each of the candidate images 402 in the sample set 400 is individually analyzed and processed. In the present example, the exemplary candidate image 402a represents Lou Seal™/©, the mascot of the San Francisco Giants (see FIG. 6). This exemplary candidate image 402a is used to describe principles and concepts embodied in the algorithm processes. The algorithm 300 establishes a theoretical grid 700 (see FIG. 7) that subdivides the candidate image 402a into a plurality of grid elements 702a to 702n (306). The number and location of the grid elements 702a to 702n are selected to balance processing speed and capability with accuracy and resolution. The exemplary grid 700 is a thirty-two by thirty-two (32×32) grid comprising one thousand twenty-four grid elements 702a to 702n (where a=1 and n=1024). In other embodiments, the theoretical grid 700 may include two hundred fifty-six grid elements (16×16), four thousand ninety-six grid elements (64×64) or any other configuration that provides a complete capture of the candidate image without running into the computational limits of the processor 202.

When establishing the theoretical grid 700, the algorithm 300 can compensate for any translation and skew in the candidate image that may be introduced by, for example, the image acquisition device 150. For example, the boundary of the grid 700 may be defined by the first pixel in the candidate image as the upper left corner and the last pixel in the candidate image as the lower right corner.

Once the theoretical grid 700 has been defined, each grid element 702a to 702n is analyzed by the algorithm 300 to identify features contained therein (308). The features for identification can be, for example, the number of non-white pixels, a group of connected or tightly spaced pixels, the number of pixels displaying predefined color, brightness, intensity or other characteristics. If the candidate image 402a and the sample set 400 are in color, the grid 700 may be a multi-dimensional array arranged to process color component of, for example, RGB, CMYK or any other known or later developed color model.

Figure 8A:
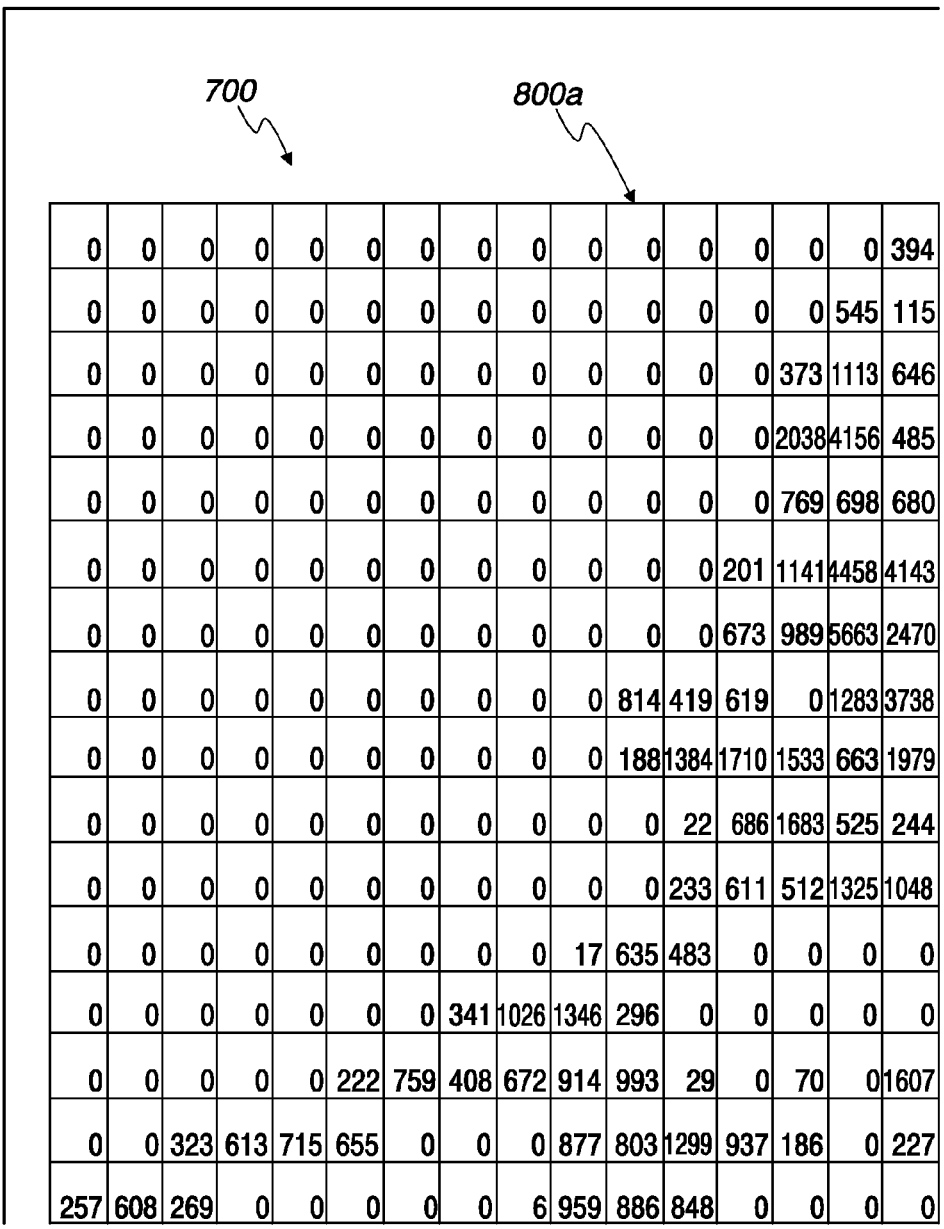
Figure 9A:
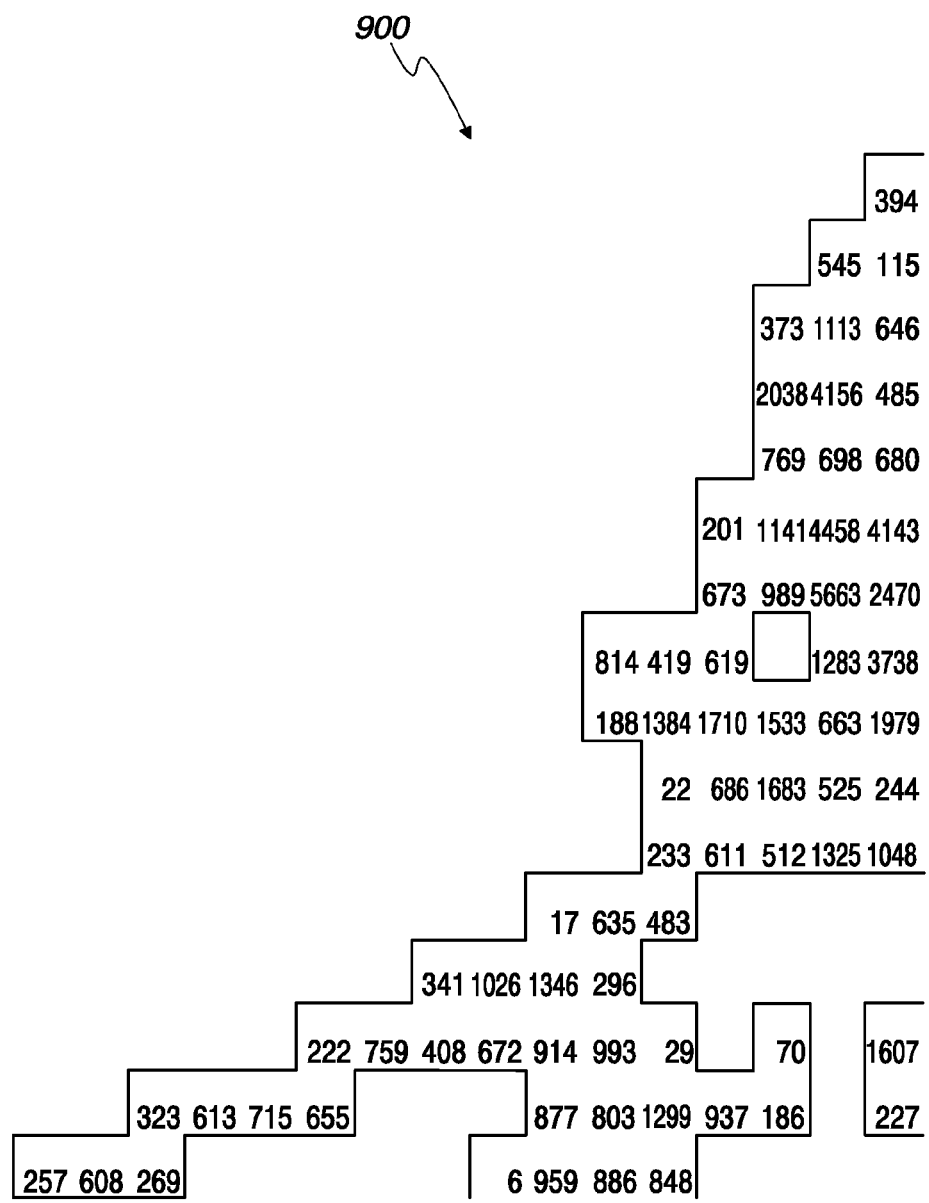
Figure 9B:
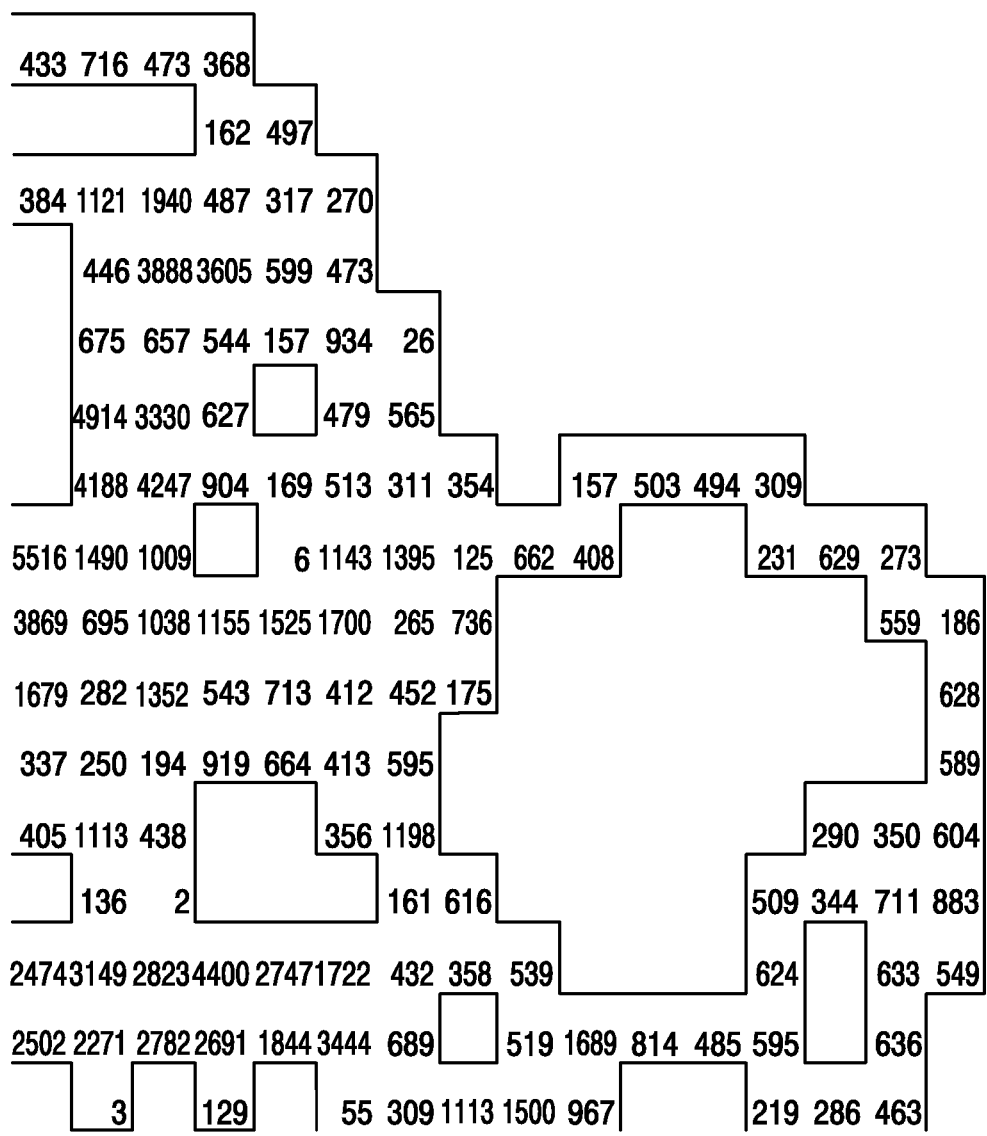
Figure 9C:
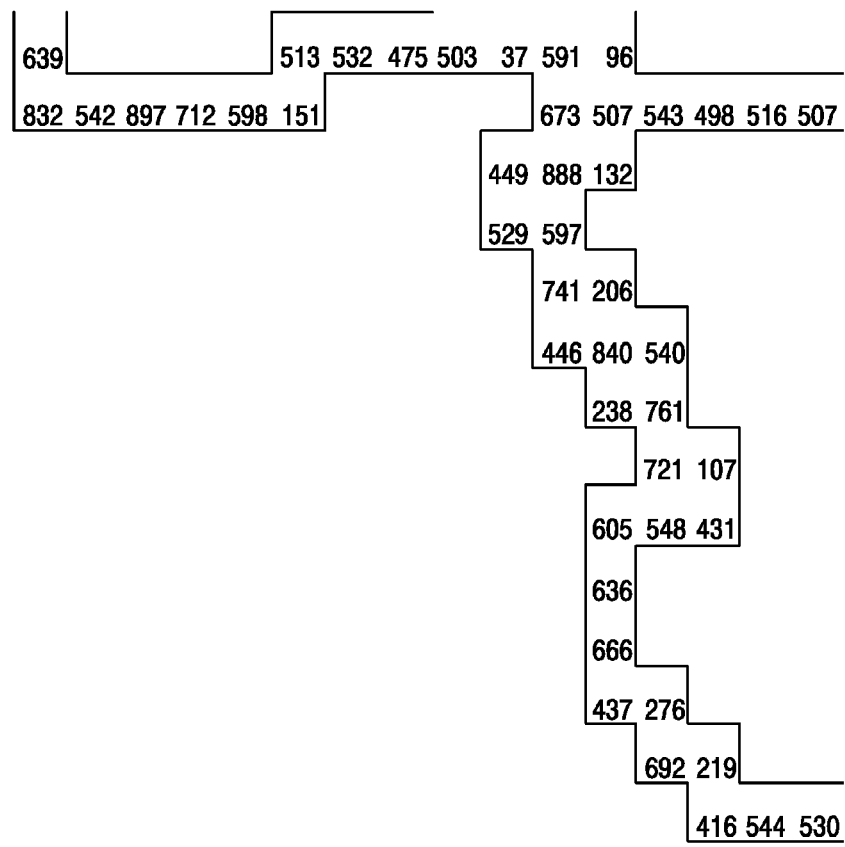
Figure 9D:
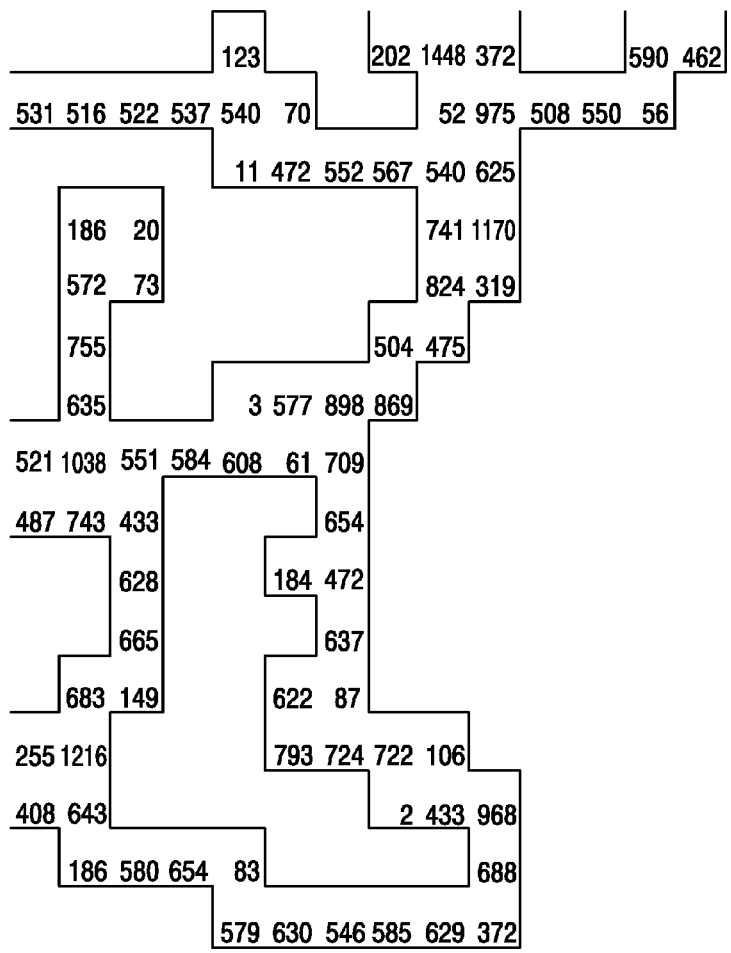
Figure 10:
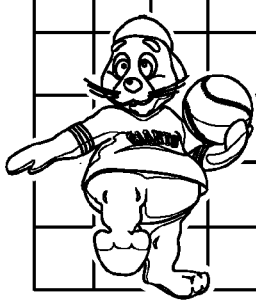
FIGS. 10 and 11 illustrate a numeric thumbnail of the exemplary candidate image and another numeric thumbnail.

The results of the analysis performed by the algorithm 300 populates the grid 700 with grid values 800a to 800n that represent the identified features (see FIG. 8). FIG. 9 illustrates the non-zero grid values resulting from the analysis of the candidate image 402a by the algorithm 300. Specifically, the non-zero grid values define a rough image 900 of the candidate image 402a. The resolution or correlation of the rough image 900 to the candidate image 402a may be adjusted by increasing or decreasing the overall number of grid elements 702a to 702n in the grid 700.

The information associated with the grid elements 800a to 800n and illustrated in by the rough image 900 may, in turn, be utilized by the algorithm 300 to define a numeric thumbnail (310). The numeric thumbnail acts as a unique fingerprint to identify the candidate image 402a. In this embodiment, the numeric thumbnail includes the two-dimensional array of grid values 800a to 800n associated with the respective grid elements 702a to 702n. The numeric thumbnail further includes a total grid count or grid total that represents the sum of the individual grid values 800a to 800n.

The algorithm 300 loops and repeats this analysis process to generate a numeric thumbnail for each of the candidate images in the sample set 400 (312). However, if all of the candidate images 402 in the sample set 400 have been analyzed and a numeric thumbnail had been created for each, then the plurality of numeric thumbnails can be sorted and/or arranged by the algorithm 300. Once all of the sorted and arranged candidate images 402 have been analyzed, the resulting thumbnails and information can be further sorted by the total grid count (314).

In order to sort the numeric thumbnails representing, for example, the candidate images 402a and 402b (see FIGS. 10 and 11, respectively), the algorithm 300 calculates a similarity score (316). The similarity score provides an indication of the commonality or relative "likeness" between two candidate images based on a comparison of their individual numeric thumbnails. The result or output from a similarity score calculation is a value between zero (0) and one (1). It should be noted that the similarity score can be a negative value when the match between two numeric thumbnails is very poor. The similarity score may be calculated according to the formula:

$$SS = \frac{\sum_{i=1}^{k} [x_i]^2 - \sum_{i=1}^{k} [x_i - y_i]^2}{\sum_{i=1}^{k} [x_i]^2 + 1} \quad \text{Formula 1}$$

where:

k is a total number of grid elements being evaluated;

i is a current number of the grid element being evaluated;

$x_i$ is a grid value associated with the determined numeric thumbnail of the candidate image of interest; and $y_i$ is a grid value associated with the determined numeric thumbnail of the candidate image being compared to the candidate image of interest.

In another embodiment, the similarity score may be computed in simplified manner according to the formula:

$$SS = \frac{\sum_{i=1}^{k} \max(x_i, y_i) - \sum_{i=1}^{k} |x_i - y_i|}{\sum_{i=1}^{k} \max(x_i, y_i) + 1} \quad \text{Formula 2}$$

where:

k is a total number of grid elements being evaluated;

i is a current number of the grid element being evaluated;

$x_i$ is a grid value associated with the determined numeric thumbnail of the candidate image of interest; and $y_i$ is a grid value associated with the determined numeric thumbnail of the candidate image being compared to the candidate image of interest.

In practice, the algorithm 300 determines the sum of square differences between corresponding grid elements 702a to 702n of two numeric thumbnails (as shown in Formula 1). By taking the sum of the square differences, the possibility of negative values can be eliminated which, in turn, prevents portions of the numeric thumbnails from canceling each other out and resulting in an inaccurate similarity score.

In another embodiment, the similarity score may be derived without utilizing the sum of square differences between corresponding grid elements 702a to 702n (as shown in Formula 2). In this embodiment, the max function is utilized to identify the larger of the two corresponding grid elements 702a to 702n and the absolute value function is utilized to prevent the possibility of negative values between the grid elements. In this instance, the possibility of negative values is eliminated by taking the sum of the absolute value of the differences that, as discussed above, prevents portions of the two numeric thumbnails from canceling each other out. Because of equation's simplicity, the similarity score calculated via Formula 2 may be computationally preferable.

Returning to the FIGS. 10 and 11, a difference term may be calculated by comparing the numeric thumbnail 1000 representing Lou Seal™/©, the mascot for the San Francisco Giants (FIG. 10), and the numeric thumbnail 1100 representing Homer the Brave™/©, the mascot of the Atlanta Braves (FIG. 11). In this example, the numeric thumbnails are constructed from grids including two hundred fifty-six grid elements (16×16). As previously discussed the size of the grid may be varied based on, for example, the desired precision of the numeric thumbnail, the processing resources available, the overall speed of the algorithm 300. Table 1 represents difference calculations between the first row of the numeric thumbnail 1000 (FIG. 10.) and the first row of the numeric thumbnail 1100 (FIG. 11) as implemented in Formula 2.

TABLE 1

Figure 11:
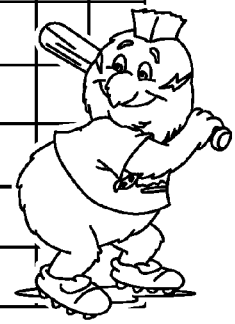

Difference calculation between the first row of the numeric thumbnail 1000 (FIG. 10.) and the first row of the numeric thumbnail 1100 (FIG. 11)

| Position (X, Y) | ABS($x_i - y_i$) | Difference Terms |
|---|---|---|
| (1, 1) | ABS(0 – 0) | 0 |
| (1, 2) | ABS(0 – 9) | 0 |
| (1, 3) | ABS(0 – 3074) | 3074 |
| (1, 4) | ABS(0 – 2107) | 2107 |
| (1, 5) | ABS(0 – 0) | 0 |
| (1, 6) | ABS(0 – 0) | 0 |
| (1, 7) | ABS(0 – 0) | 0 |
| (1, 8) | ABS(1054 – 0) | 1054 |
| (1, 9) | ABS(1149 – 4241) | 3092 |
| (1, 10) | ABS(1003 – 2870) | 1867 |
| (1, 11) | ABS(497 – 4248) | 3751 |
| (1, 12) | ABS(0 – 2604) | 2604 |
| (1, 13) | ABS(0 – 3203) | 3203 |
| (1, 14) | ABS(0 – 0) | 0 |
| (1, 15) | ABS(0 – 0) | 0 |
| (1, 16) | ABS(0 – 0) | 0 |

Each of the remaining fifteen (15) rows of the numeric thumbnails can be compared by the algorithm 300 in the same manner. In this way, the sum of the difference terms calculated between each grid element 702a to 702n in the numeric thumbnails 1000 and 1100 can be determined. In another embodiment, the sum of difference terms along with the squared sum of the grid values $x_i$ associated with the candidate image of interest can be used in Formula 1 to calculate a similarity score between the first numeric thumbnail 1000 and the second numeric thumbnail 1100. A similarity score closer to one (1) indicates a better match (i.e., when the difference between the two images is small, the similarity score will be close to 1). This similarity score calculation is repeated by the algorithm 300 for each candidate image 402 in the sample set 400 (318).

Figure 6:

Once the similarity scores have been calculated for each candidate image 402 within the sample set 400, the algorithm 300 identifies which of the candidate images 402 has the best similarity score (i.e., the score closest to 1) relative to the candidate image of interest. In the example at hand, the algorithm 300 determines which candidate image 402b to 402n has the best similarity score to the candidate image 402a of Lou Seal (FIG. 6). The candidate image 402b to 402n having the highest similarity score is removed from the sample set 400 and stored in logical image group order with the original or first candidate image 402a (320).

If, for the sake of explanation, the candidate image having the highest similarity score is candidate image 402g; then the candidate image 402g is identified or set to be the new reference or candidate image of interest (322). Once the new or next reference or candidate image of interest is identified, the algorithm 300 repeats the similarity score calculations with the remaining candidate imaged 402 within the now-reduced sample set 400 (324).

In this way, candidate images 402 having high similarity score values relative to each other will be identified and stored in the memory 204. Because these candidate images are arranged based on their relative similarity to each other, the resulting organized sample set 400 is considered to be in a basic logical group image order.

Once all of the candidate images 402 have been placed in logical group image order and stored in the memory 204, the algorithm 300 can evaluate their relative similarities scores based on, for example, a cluster threshold. The cluster threshold establishes a range or tolerance such that similarity scores falling within the tolerance can be considered to be part of a group or cluster by the algorithm 300. In this way, candidate images 402 can be grouped or clustered together when their respectively similarity scores are close enough together. Once the algorithm 300 has identified all of the clusters of like images arranged in logical group image order, the algorithm 300 can present these clustered images to the user or system for further processing and/or evaluation.

In other embodiments, the similarity score calculation shown in Formula 1 may be further refined to ensure that candidate images having smaller grid totals are treated the same as candidate images having larger grid count totals. In order to adjust for any bias introduced based on the relative size of the grid count totals, the basic similarity score calculation shown in Formula 1 may be refined utilizing a tuning or compensation factor ($n_k$). The revised similarity score formula may be expressed as:

$$SS = \frac{\sum_{i=1}^{k}[x_i]^2 + \left[\sum_{i=1}^{k}\left(\frac{x_i}{n_k}\right)\right]^2 - \sum_{i=1}^{k}[x_i - y_i]^2 - \left[\sum_{i=1}^{k}\left(\frac{x_i}{n_k}\right) - \sum_{i=1}^{k}\left(\frac{y_i}{n_k}\right)\right]^2}{\sum_{i=1}^{k}[x_i]^2 + \left[\sum_{i=1}^{k}\left(\frac{x_i}{n_k}\right)\right]^2 + 1} \quad \text{Formula 3}$$

where:

k is a total number of grid elements being evaluated;

i is a current number of the grid element being evaluated;

$x_i$ is a grid value associated with the determined numeric thumbnail of the candidate image of interest;

$y_i$ is a grid value associated with the determined numeric thumbnail of the candidate image being compared to the candidate image of interest; and $n_k$ is an empirically derived tuning or compensation factor.

The grid total compensation factors or biases utilized by the similarity score equation shown in Formula 3, are derived to ensure that the average value of each term of the equation are approximately the same order of magnitude and/or size. In practice, a value of the grid total compensation factor is iteratively calculated by comparing the average value of each term in the equation calculated over a clustering run. If the grid total compensation factor results in values that are too small, then the bias correction effect is negligible. However, if the grid total compensation factor results in values that are too large, then these values overwhelm the equation and the existing similarity score terms are overshadowed. By adjusting the size of the grid total compensation factor ($n_k$) relative size of the terms of Formula 3 can adjusted up or down. The value of the compensation factor $n_k$ is varied based upon the grid size and features being counted (308). In practice, the value of the compensation factor $n_k$ operates as a penalty factor to compensate for size of the grid, grid elements and the resulting grid values.

In another embodiment, the algorithm 300 may further include or implement a processing enhancement that utilizes a pixel threshold. Specifically, the algorithm 300 may evaluate the total grid count of each numeric thumbnail against a pixel threshold or tolerance prior to calculating similarity scores (see 314). In this way, if the total grid count between the two candidate images 402 are outside the tolerance or threshold, the algorithm 300 assumes that they are unlikely to be a good match. For example, if the total grid counts between the two candidate images differed by a factor of ten (10), it is clear that the images will have a low similarity score. Once this has been established, the processing resources can be redirected to another candidate image that may have a better chance of being a good match.

In another embodiment, the algorithm 300 may further include or implement a success threshold to evaluate the similarity scores as they are calculated. For example, if a success threshold were established to be 0.75, the algorithm 300 may discontinue the processing of other candidate images 402 in the sample set 400 once a similarity score has been determined to exceed the value.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A system for organizing a plurality of candidate images based on the relative similarity of each of the plurality of candidate images with respect to the remaining of the plurality of candidate images, the system comprising:
   a controller in communication with a storage device configured to receive and accessibly store a generated plurality of candidate images, wherein the controller is operable to:
   analyze each of the plurality of candidate images to sub-divide the candidate image into a plurality of grid elements of an array and determine a corresponding numeric thumbnail for the candidate image, the corresponding numeric thumbnail being based on a number of identified features in each of the plurality of grid elements and a sum total number of all identified features in all of the plurality of grid elements;
   calculate a similarity score between each of the plurality of determined numeric thumbnails and the remaining plurality of determined numeric thumbnails; and
   generate a logical group image order as a function of the highest similarity score between each of the plurality of determined numeric thumbnails and the remaining plurality of determined numeric thumbnails.

2. The system of claim 1, wherein the array is selected from the group consisting of: a two-dimensional array, a three-dimensional array and a four-dimensional array.

3. The system of claim 1, wherein the similarity score is computed by a computation of a first squared sum of the grid values associated with the one of the plurality of determined numeric thumbnails, and then by a computation of a second squared sum of the difference between the grid values associated with the one of the plurality of determined numeric thumbnails and one of the remaining plurality of determined numeric thumbnails, wherein the difference between the first and second squared sums is then divided by a sum of one plus the squared sum of the grid values associated with the one of the plurality of determined numeric thumbnails.

4. The system of claim 3, wherein the similarity score includes a penalty factor.

5. The system of claim 1, wherein the similarity score is computed by a computation of a first sum of maximum grid values from each of the plurality of determined numeric thumbnails being compared, and then computation of a second sum of the absolute value of the difference between the grid values associated with the one of the plurality of determined numeric thumbnails and one of the remaining plurality of determined numeric thumbnails, wherein the difference between the first and second sums is then divided by a sum of one plus the sum of maximum grid values from each of the plurality of determined numeric thumbnails being compared.

6. The system of claim 1, wherein each of the determined numeric thumbnails includes a plurality of grid values and a grid total.

7. The system of claim 1, wherein the controller is configured to group similarity scores within the logical group image order to define a cluster.

8. The system of claim 7, wherein the cluster is defined by a cluster threshold.

9. The system of claim 1, wherein the controller is configured to calculate the similarity score in an iterative manner.

10. The system of claim 9, wherein the controller is further configured to remove the numeric thumbnail having the highest similarity score from the plurality of determined numerical thumbnails once it has been placed in logical group image order.

11. The system of claim 10, wherein the removed numeric thumbnail is a starting point for the next iterative calculation of the similarity score.

12. The system of claim 1, wherein the similarity score is defined as:

$$SS = \frac{\sum_{i=1}^{k} \|x_i\|^2 + \left[\sum_{i=1}^{k}\left(\frac{x_i}{n_k}\right)\right]^2 - \sum_{i=1}^{k} \|x_i - y_i\|^2 - \left[\sum_{i=1}^{k}\left(\frac{x_i}{n_k}\right) - \sum_{i=1}^{k}\left(\frac{y_i}{n_k}\right)\right]^2}{\sum_{i=1}^{k} \|x_i\|^2 + \left[\sum_{i=1}^{k}\left(\frac{x_i}{n_k}\right)\right]^2 + 1}$$

where:
k is a total number of grid elements being evaluated;
i is a current number of the grid elements being evaluated;
$x_i$ is a grid value associated with the one of the plurality of determined numeric thumbnails;
$y_i$ is a grid value associated with the one of the remaining plurality of determined numeric thumbnails; and
$n_k$ is an empirical tuning factor.

13. The system of claim 1, wherein the similarity score is defined as:

$$SS = \frac{\sum_{i=1}^{k} \max(x_i, y_i) - \sum_{i=1}^{k} |x_i - y_i|}{\sum_{i=1}^{k} \max(x_i, y_i) + 1}$$

where:
k is a total number of grid elements being evaluated;
i is a current number of the grid elements being evaluated;
$x_i$ is a grid value associated with the one of the plurality of determined numeric thumbnails; and
$y_i$ is a grid value associated with the one of the remaining plurality of determined numeric thumbnails.

14. A method of organizing a plurality of candidate images based on the relative similarity of each of the plurality of candidate images with respect to the remaining of the plurality of candidate images, the method comprising:
   defining an analysis grid with which to sub-divide each of a stored plurality of candidate images into two or more grid elements;

analyzing each of the grid elements within the analysis grid to determine grid values corresponding to each portion of each of the plurality of candidate images contained within each of the grid elements;

defining a numeric thumbnail for each of the plurality of candidate images based on the determined grid values and a grid total of all of the determined grid values for said candidate image;

calculating a similarity score based the determined grid values corresponding to each of the plurality of candidate images and the determined grid values corresponding to the remaining of the plurality of candidate images; and generating a logical group image order as a function of the highest similarity score determined between each of the plurality of candidate images and the remaining of the plurality of candidate images.

15. The method of claim 14 further comprising:
storing the generated plurality of candidate images in an accessible memory device.

16. The method of claim 14, wherein defining an analysis grid includes dividing the candidate images into a two-dimensional array of grid elements.

17. The method of claim 14, wherein the similarity score is computed by a computation of a first squared sum of the grid values associated with the one of the plurality of determined numeric thumbnails, and then a computation of a second squared sum of the difference between the grid values associated with the one of the plurality of determined numeric thumbnails and one of the remaining plurality of determined numeric thumbnails, wherein the difference between the first second squared sums is then divided by a sum of one plus the squared sum of the grid values associated with the one of the plurality of determined numeric thumbnails.

18. The system of claim 14, wherein the similarity score is computed by a computation of a first sum of maximum grid values from each of the plurality of determined numeric thumbnails being compared, and then computation of a second sum of the absolute value of the difference between the grid values associated with the one of the plurality of determined numeric thumbnails and one of the remaining plurality of determined numeric thumbnails, wherein the difference between the first and second sums is then divided by a sum of one plus the sum of maximum grid values from each of the plurality of determined numeric thumbnails being compared.

19. The method of claim 14 further comprising:
grouping similarity scores within the logical group image order to define a cluster.

20. The method of claim 19 further comprising defining the cluster as a function of a cluster threshold.

21. The method of claim 14, wherein calculating the similarity score includes calculating the similarity score in an iterative manner.

22. The method of claim 21 further comprising removing the candidate image having the highest similarity score from the remaining of the plurality of candidate images once it has been placed in logical group image order.

23. The method of claim 22 further comprising:
initiating the iterative calculation of the similarity score using the removed candidate image as a starting point.

24. A method of organizing a plurality of candidate images based on the relative similarity of each of the plurality of candidate images with respect to the remaining of the plurality of candidate images, the method comprising:
storing a generated plurality of candidate images in an accessible memory device;

analyzing a grid overlaid on each of the plurality of candidate images to sub-divide the candidate image into a plurality of grid elements and determine a numeric thumbnail, wherein the numeric thumbnail is based on grid values corresponding to each of the of the plurality of grid elements and a grid total of all of the grid values of the plurality of grid elements; and calculating a similarity score based the determined grid values corresponding to each of the plurality of candidate images and the determined grid values corresponding to each of the remaining of the plurality of candidate images.

25. The method of claim 24 further comprising:
generating a logical group image order as a function of the highest similarity score determined between the one of the plurality of candidate images and each of the remaining of the plurality of candidate images.

26. The method of claim 24 further comprising:
grouping similarity scores within the logical group image order to define a cluster.

27. The method of claim 24, wherein the grid is a two-dimensional array of grid elements.

28. The method of claim 24, wherein the grid is a 32×32 array of grid elements.

29. The method of claim 24, wherein analyzing a grid further comprises determining a number of non-white pixels within each grid element.

30. The method of claim 24, wherein the grid is a multi-dimensional array of grid elements.

31. The method of claim 30, wherein the multi-dimensional array of grid elements is arranged for processing color components of a color model.

32. A method of organizing a plurality of candidate images based on the relative similarity of each of the plurality of candidate images with respect to the remaining of the plurality of candidate images, the method comprising:
analyzing each of a plurality of candidate images to determine a similarity score, wherein the plurality of candidates images includes an unknown number of candidate types, the analyzing comprising defining a numeric thumbnail for each of the plurality of candidate images based on grid values determined by sub-dividing the candidate image into two or more grid elements and determining the grid values corresponding to each portion of the candidate image contained within each grid element, and a grid total of all of the determined grid values for the candidate image; and organizing each of a plurality of candidate images into a number of clusters based on the similarity score, wherein the number of clusters is unknown prior to organizing.

33. The method of claim 32, wherein the grid values represent a number of identified features in each of the plurality of grid elements.

34. The method of claim 33 further comprising:
calculating the similarity score based the determined grid values corresponding to one of the plurality of candidate images and the determined grid values corresponding to each of the remaining of the plurality of candidate images; and generating a logical group image order as a function of the highest similarity score determined between the one of the plurality of candidate images and each of the remaining of the plurality of candidate images.

* * * * *